(12) United States Patent
Matsushita et al.

(10) Patent No.: US 9,923,474 B2
(45) Date of Patent: Mar. 20, 2018

(54) POWER SUPPLY APPARATUS (71) Applicant: YAZAKI CORPORATION, Tokyo (JP)

(72) Inventors: Yoshinori Matsushita, Shizuoka (JP); Osamu Kimura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 126 days.

(21) Appl. No.: 15/212,766

(22) Filed: Jul. 18, 2016

(65) Prior Publication Data
US 2017/0025956 A1 Jan. 26, 2017

(30) Foreign Application Priority Data

Jul. 24, 2015 (JP) ................................ 2015-146407

(51) Int. Cl.
H02M 3/28 (2006.01)
H02M 3/335 (2006.01)

(52) U.S. Cl.
CPC ... *H02M 3/33576* (2013.01); *H02M 3/33561* (2013.01)

(58) Field of Classification Search
None
See application file for complete search history.

(56) References Cited

U.S. PATENT DOCUMENTS

| 6,026,005 A | 2/2000 | Abdoulin |
| 6,239,994 B1 | 5/2001 | Abdoulin |
| 2001/0002171 A1 | 5/2001 | Abdoulin |

FOREIGN PATENT DOCUMENTS

| JP | 2000-116135 A | 4/2000 |
| JP | 2011-155837 A | 8/2011 |
| JP | 2013-247814 A | 12/2013 |

OTHER PUBLICATIONS

Japanese Office Action for the related Japanese Patent Application No. 2015-146407 dated Sep. 26, 2017.

*Primary Examiner* — Jared Fureman
*Assistant Examiner* — Aqeel Bukhari
(74) *Attorney, Agent, or Firm* — Kenealy Vaidya LLP (57) ABSTRACT A power supply apparatus includes a primary-side circuit and a secondary-side circuit magnetically coupled by a transformer. The secondary-side circuit includes: a first circuit that is connected to a secondary winding of the transformer, performs current doubler rectification, and outputs a first output voltage; a second circuit that is connected to the secondary winding of the transformer, performs a step-down chopping operation, and outputs a second output voltage; semiconductor switching elements that control the step-down chopping operation; and diodes that are shared by the first circuit and the second circuit when rectifying a direct current voltage supplied from the primary-side circuit. The first circuit includes first inductors connected in parallel. A control unit controls switching of the primary-side circuit to establish electrical continuity between the secondary winding of the transformer and the first inductors in order.

3 Claims, 4 Drawing Sheets

TWO PATHS

TOTAL CONDUCTION LOSS: $\left(\dfrac{I}{2}\right)^2 R \times 2 = \dfrac{I^2 R}{2}$

FIG. 5 n PATHS

TOTAL CONDUCTION LOSS: $\left(\dfrac{I}{n}\right)^2 R \times n = \dfrac{I^2 R}{n}$

POWER SUPPLY APPARATUS

CROSS REFERENCE TO RELATED APPLICATION(S)

This application is based on and claims priority from Japanese Patent Application (Application No. 2015-146407) filed on Jul. 24, 2015, the entire contents of which are incorporated herein by reference.

BACKGROUND

1. Field of the Invention

The present invention relates to a power supply apparatus.

2. Description of the Related Art

In an example of a supply apparatus for a vehicle-mounted device, a full-bridge inverter is provided on a primary side, and power of each of two different voltages is transmitted to a secondary side via a transformer (for example, see JP-A-2013-247814).

In the technique described in JP-A-2013-247814, a primary winding, a secondary winding, and a tertiary winding are wound in the transformer. The full-bridge inverter is connected to the primary winding, and hence the primary winding serves as part of the primary side of the transformer. On the other hand, the secondary winding and the tertiary winding serve as parts of the secondary side of the transformer.

More specifically, a first circuit includes a plurality of diodes, an inductor, and a capacitor, and is connected to the secondary winding. A second circuit includes a rectification circuit including a plurality of diodes and a plurality of semiconductor switching elements, and a step-down chopper circuit, and is connected to the tertiary winding.

The output voltage of the first circuit is controlled by a switching operation of the full-bridge inverter provided in the primary side, and the output voltage of the second circuit is controlled by a switching operation of the semiconductor switching elements of the rectification circuit which is connected to the tertiary winding. With this configuration, two different voltages are output at the same time using the single transformer.

The switching operation timing of the full-bridge inverter provided in the primary side and that of the semiconductor switching elements of the rectification circuit connected to the tertiary winding are controlled in outputting two different voltages at the same time using the single transformer, whereby the switching loss and surge voltages are lowered.

SUMMARY

However, in the technique described in JP-A-2013-247814 in which the circuit in the secondary side of the transformer is completely divided into two parts, individual components are large in size and the number of components is large. Furthermore, ripple currents and ripple voltages occur depending on switching frequencies, which increases the circuit loss and increase the sizes of output filters.

Therefore, techniques such as the technique described in JP-A-2013-247814 cannot realize low loss and reduction of size while producing a plurality of different voltages at the same time.

The present invention has been made in view of the above circumstances, and an object of the invention is to provide a power supply apparatus which can realize low loss and reduction of size while outputting a plurality of different voltages at the same time.

In an aspect of the present invention, there is provided a power supply apparatus including: a primary-side circuit that converts direct current to alternating current; a secondary-side circuit that converts alternating current to direct current; a transformer that magnetically couples the primary-side circuit and the secondary side circuit; and a control unit that controls the primary-side circuit and the secondary-side circuit, wherein the secondary-side circuit includes: a first circuit that is connected to a secondary winding of the transformer, performs current doubler rectification, and outputs a first output voltage; a second circuit that is connected to the secondary winding of the transformer, performs a step-down chopping operation, and outputs a second output voltage; a plurality of semiconductor switching elements that control the step-down chopping operation; and a plurality of diodes that are shared by the first circuit and the second circuit when rectifying a direct current voltage supplied from the primary-side circuit, wherein the first circuit includes a plurality of first inductors connected in parallel, and wherein the control unit controls switching of the primary-side circuit to establish electrical continuity between the secondary winding of the transformer and the first inductors in order.

According to the power supply apparatus of the aspect of the present invention, it is possible to realize low loss and reduction of size while outputting a plurality of different voltages at the same time.

In the power supply apparatus of the aspect of the present invention, the second circuit may include a plurality of second inductors connected in parallel, and the control unit may control switching of the primary-side circuit and the semiconductor switching elements to establish electrical continuity between the secondary winding of the transformer and the second inductors in order.

In the power supply apparatus of the aspect of the present invention, the control unit may turn on the semiconductor switching elements in order according to a switching operation of the primary-side circuit.

According to an aspect of the present invention, it is possible to provide a power supply apparatus which can realize low loss and reduction of size while outputting a plurality of different voltages at the same time.

DETAILED DESCRIPTION

Figure 1:
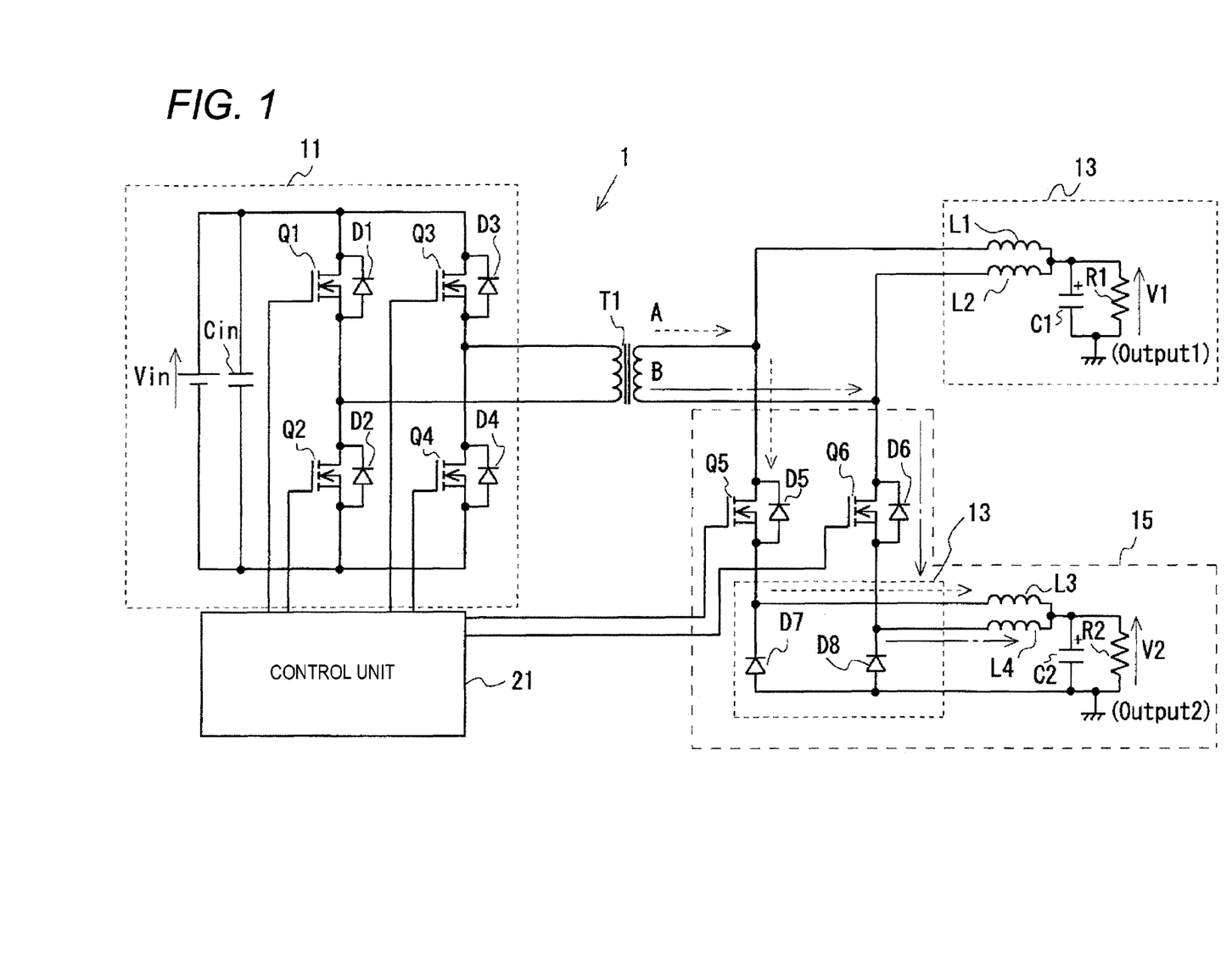
FIG. 1 shows an example of a circuit topology of a power supply apparatus according to an embodiment of the present invention.

FIG. 1 shows an example of a circuit topology of a power supply apparatus 1 according to an embodiment of the present invention. As shown in FIG. 1, the power supply apparatus 1 includes an inverter circuit 11, a current doubler rectification circuit 13, a step-down chopper circuit 15, a transformer T1, a control unit 21, etc. A primary-side circuit for DC-to-AC conversion and a secondary-side circuit for AC-to-DC conversion are coupled to each other magnetically via the transformer T1.

The primary-side circuit is the inverter circuit 11. As shown in FIG. 1, the inverter circuit 11 is a full-bridge inverter and supplies power to the secondary-side circuit via the single-phase transformer T1.

More specifically, the inverter circuit 11 includes a capacitor Cin, semiconductor switching elements Q1-Q4, and diodes D1-D4. An input voltage Vin is applied to the capacitor Cin. The diodes D1-D4 are connected to the respective semiconductor switching elements Q1-Q4 back to back.

The secondary-side circuit includes the current doubler rectification circuit 13 and the step-down chopper circuit 15 and hence has both of a current doubler rectifying function and a step-down chopping function. More specifically, the secondary-side circuit includes a first circuit (described later), a second circuit (described later), semiconductor switching elements Q5 and Q6, and diodes D5-D8. The current doubler rectification circuit 13 includes the first circuit and the diodes D5-D8. The step-down chopper circuit 15 includes the second circuit, the semiconductor switching elements Q5 and Q6, and the diodes D7 and D8.

Among the above components, the diodes D7 and D8 are shared by the first circuit and the second circuit in rectifying an AC voltage supplied from the primary-side circuit. The semiconductor switching elements Q5 and Q6 control a step-down chopping operation.

The first circuit, which is connected to the secondary winding of the transformer T1, performs current doubler rectification and outputs a first output voltage V1. More specifically, the first circuit includes parallel-connected first inductors L1 and L2 and a parallel connection of an output capacitor C1 and a resistor R1. The parallel connection of the first inductors L1 and L2 and the parallel connection of the output capacitor C1 and the resistor R1 are connected to each other in series. The resistor R1 serves for output of the first output voltage V1 (Output1) and is provided with a voltage detection mechanism (not shown).

The diodes D5 and D6 are connected to the respective semiconductor switching elements Q5 and Q6 back to back. The semiconductor switching element Q5, the first inductor L1, and the diode D7 are connected to each other in series. The semiconductor switching element Q6, the first inductor L2, and the diode D8 are connected to each other in series. The series connection of the semiconductor switching element Q5, the first inductor L1, and the diode D7 and the series connection of the semiconductor switching element Q6, the first inductor L2, and the diode D8 are connected to each other in parallel to form two secondary-side large-current branch paths.

The second circuit, which is connected to the secondary winding, performs a step-down chopping operation and outputs a second output voltage V2. Where it is not necessary to discriminate between the first output voltage V1 and the second output voltage V2, they will be referred to as output voltages V.

More specifically, the second circuit includes parallel-connected second inductors L3 and L4 and a parallel connection of an output capacitor C2 and a resistor R2. The resistor R2 serves for output of a second output voltage V2 (Output2) and is provided with a voltage detection mechanism (not shown).

The control unit 21, which controls the primary-side circuit and the secondary-side circuit, includes, for example, a ROM, a RAM, a CPU, and an I/O interface. By controlling a switching operation of the primary-side circuit, the control unit 21 establishes electrical continuity between the secondary winding of the transformer T1 and the first inductors L1 and L2 in order. Furthermore, by controlling the switching operation of the primary-side circuit and switching operations of the semiconductor switching elements Q5 and Q6, the control unit 21 establishes electrical continuity between the secondary winding of the transformer T1 and the second inductors L3 and L4 in order. That is, the control unit 21 turns on the semiconductor switching elements Q5 and Q6 in order according to the switching operation of the primary-side circuit.

More specifically, the control unit 21 causes the inverter circuit 11 (primary-side circuit) to generate a rectangular-wave voltage and has it transmitted to the secondary-side circuit with insulation secured by the transformer T1. The control unit 21 controls the semiconductor switching elements Q1-Q6 on the basis of signals supplied from the voltage detection mechanisms (not shown) and thereby produce prescribed output voltages V1 and V2 as Output1 and Output2.

Even more specifically, the control unit 21 produces a constant first output voltage V1 (Output1) by varying the switching duty ratios of the semiconductor switching elements Q1-Q4 according to the first output voltage V1. The control unit 21 performs this control by a phase shift method, for example. On the other hand, the control unit 21 varies the switching duty ratios of the semiconductor switching elements Q5 and Q6 according to the second output voltage V2 (Output2).

In doing so, the control unit 21 performs controls so that the semiconductor switching element Q5 is turned on only when a current flows through the secondary winding of the transformer T1 in direction A and the semiconductor switching element Q6 is turned on only when a current flows through the secondary winding of the transformer T1 in direction B. More specifically, the control unit 21 turns on the semiconductor switching element Q5 only when the semiconductor switching elements Q2 and Q3 are on. On the other hand, the control unit 21 turns on the semiconductor switching element Q6 only when the semiconductor switching elements Q1 and Q4 are on.

With the above controls, the control unit 21 produces a constant second output voltage V2 (Output2) while reducing the influence on the current doubler rectifying operation.

Since the second output voltage V2 is produced according to the principle of step-down chopping, the second output voltage V2 is lower than the first output voltage V1.

Figure 2:
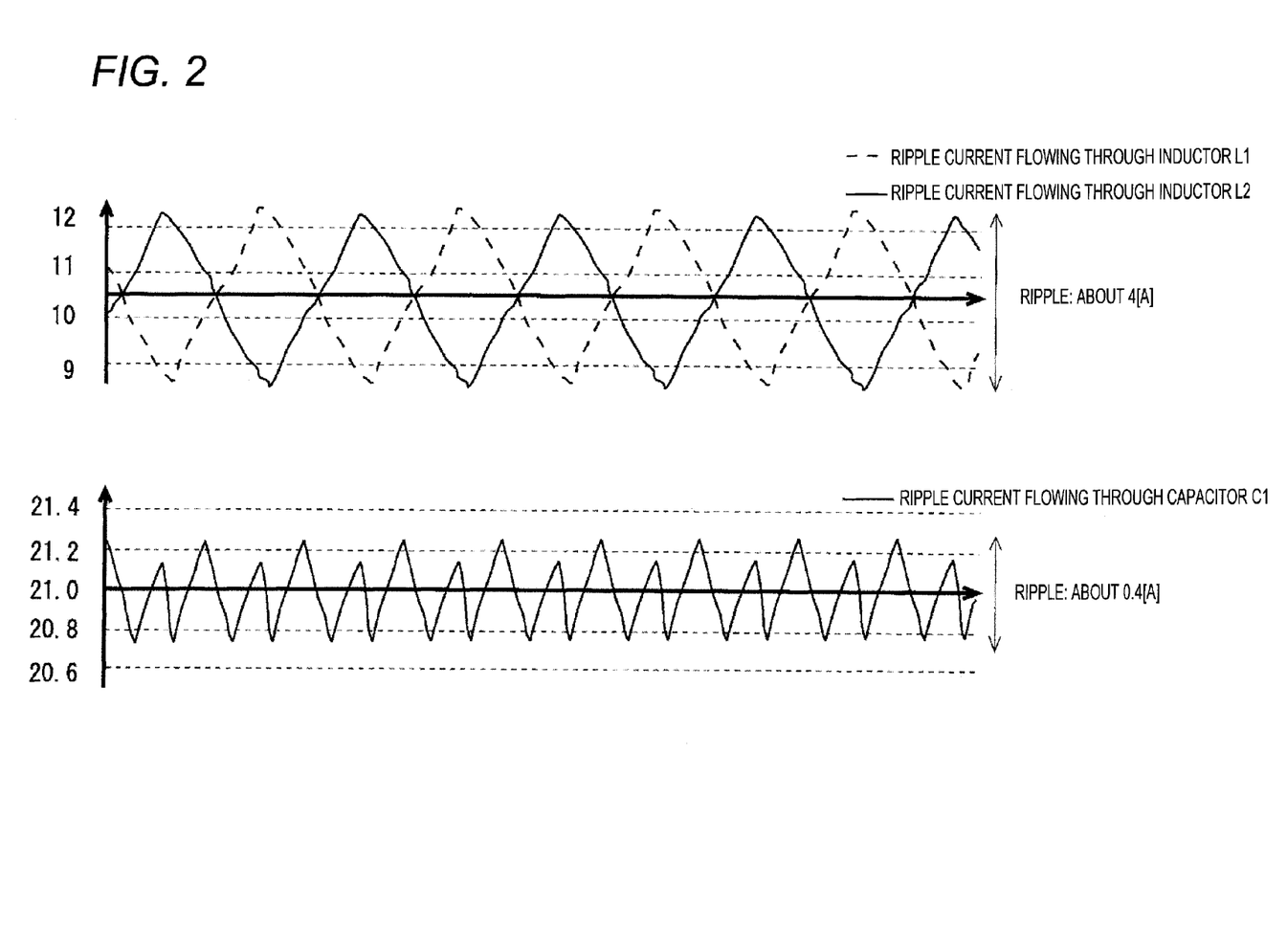
FIG. 2 shows an example of ripple currents flowing through respective parallel-connected first inductors and an example of ripple current flowing through an output capacitor C1.

FIG. 2 shows an example of ripple currents flowing through the respective parallel-connected first inductors L1 and L2 and an example of ripple current flowing through the output capacitor C1. As shown in FIG. 2, triangular-wave-like ripple currents of about 4 A that are deviated from each other in phase by about 180° flow through the first inductors L1 and L2.

On the other hand, a ripple current flowing through the output capacitor C1 is about 0.4 A, which is smaller than the ripple currents flowing through the parallel-connected first inductors L1 and L2 because of cancellation between them. Furthermore, as shown in FIG. 2, the frequency of the ripple current flowing through the output capacitor C1 is equal to two times the switching frequency.

Ripple currents flowing through the respective second inductors L3 and L4 and a ripple current flowing through the output capacitor C2 are similar to the ripple currents flowing through the respective first inductors L1 and L2 and the ripple current flowing through the output capacitor C1.

Figure 3:
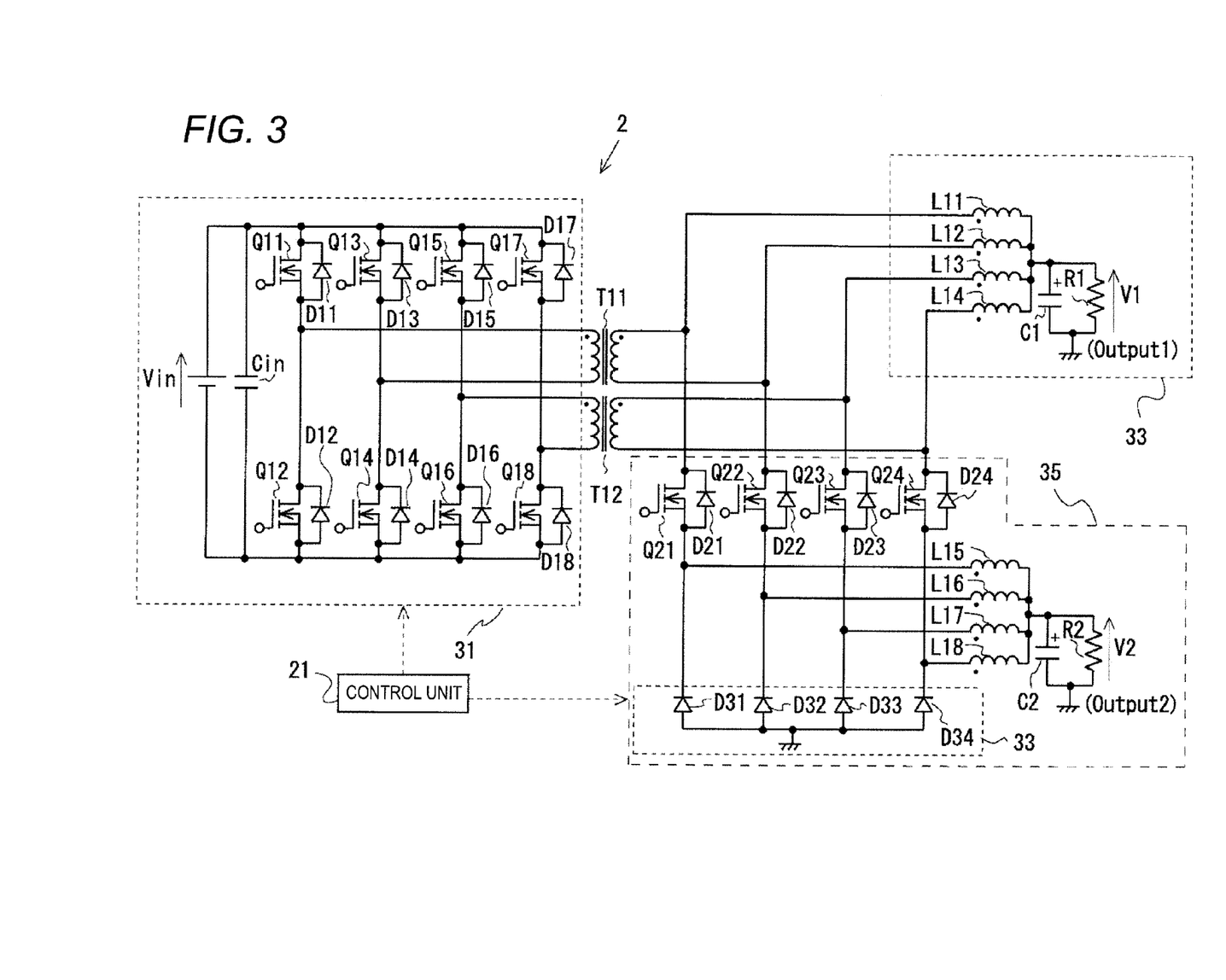
FIG. 3 shows an example of a circuit topology of another power supply apparatus according to the embodiment.

Next, a description will be made of a configuration using a multi-phase inverter circuit rather than the inverter circuit 11. FIG. 3 shows an example of a circuit topology of a power supply apparatus 2 according to the embodiment which is a 2-phase circuit using a 4-phase inverter circuit 31. As shown in FIG. 3, the power supply apparatus 2 includes the inverter circuit 31, a current doubler rectification circuit 33, a step-down chopper circuit 35, transformers T11 and T12, a control unit 21, etc. A primary-side circuit for DC-to-AC conversion and a secondary-side circuit for AC-to-DC conversion are coupled to each other magnetically via the transformers T11 and T12.

The primary-side circuit is the inverter circuit 31. As shown in FIG. 3, the inverter circuit 31 is a full-bridge inverter and supplies power to the secondary-side circuit via the transformers T11 and T12.

More specifically, the inverter circuit 31, which has a 4-phase inverter configuration, includes a capacitor Cin, semiconductor switching elements Q11-Q18, and diodes D11-D18. An input voltage Vin is applied to the capacitor Cin.

The diodes D11-D18 are connected to the respective semiconductor switching elements Q11-Q18 back to back. Among the semiconductor switching elements Q11-Q18, the semiconductor switching elements Q11-Q14 are connected to the transformer T11 and the semiconductor switching elements Q15-Q18 are connected to the transformer T12.

The secondary-side circuit includes the current doubler rectification circuit 33 and the step-down chopper circuit 35 and hence has both of a current doubler rectifying function and a step-down chopping function. More specifically, the secondary-side circuit includes a first circuit (described later), a second circuit (described later), semiconductor switching elements Q21-Q24, and diodes D21-D24 and D31-D34. The current doubler rectification circuit 33 includes the first circuit and the diodes D21-D24 and D31-D34. The step-down chopper circuit 35 includes the second circuit, the semiconductor switching elements Q21-Q24, and the diodes D31-D34.

Among the above components, the diodes D31-D34 are shared by the first circuit and the second circuit in rectifying AC voltages supplied from the primary-side circuit. The semiconductor switching elements Q21-Q24 control a step-down chopping operation.

The first circuit, which is connected to the secondary windings of the transformers T11 and T12, performs current doubler rectification and outputs a first output voltage V1. More specifically, the first circuit includes parallel-connected first inductors L11-L14 and a parallel connection of an output capacitor C1 and a resistor R1. The parallel connection of the first inductors L11-L14 and the parallel connection of the output capacitor C1 and the resistor R1 are connected to each other in series. The resistor R1 serves for output of the first output voltage V1 (Output1) and is provided with a voltage detection mechanism (not shown).

The diodes D21-D24 are connected to the respective semiconductor switching elements Q21-Q24 back to back. The semiconductor switching element Q21, the first inductor L11, and the diode D31 are connected to each other in series. The semiconductor switching element Q22, the first inductor L12, and the diode D32 are connected to each other in series. The semiconductor switching element Q23, the first inductor L13, and the diode D33 are connected to each other in series. The semiconductor switching element Q24, the first inductor L14, and the diode D34 are connected to each other in series.

The series connection of the semiconductor switching element Q21, the first inductor L11, and the diode D31, the series connection of the semiconductor switching element Q22, the first inductor L12, and the diode D32, the series connection of the semiconductor switching element Q23, the first inductor L13, and the diode D33, and the series connection of the semiconductor switching element Q24, the first inductor L14, and the diode D34 are connected to each other in parallel to form four secondary-side large-current branch paths.

The second circuit, which is connected to the secondary winding of the transformers T11 and T12, performs a step-down chopping operation and outputs a second output voltage V2. Where it is not necessary to discriminate between the first output voltage V1 and the second output voltage V2, they will be referred to as output voltages V.

More specifically, the second circuit includes parallel-connected second inductors L15-L18 and a parallel connection of an output capacitor C2 and a resistor R2. The resistor R2 serves for output of a second output voltage V2 (Output2) and is provided with a voltage detection mechanism (not shown).

In the power supply apparatus 2, as in the power supply apparatus 1, the control unit 21 controls the semiconductor switching elements Q11-Q18 and Q21-Q24 and produces prescribed output voltages V1 and V2 as Output1 and Output2. In this operation, a ripple current flowing through the output capacitor C1 is smaller than ripple currents flowing through the respective first inductors L11-L14 because they cancel out each other according to phase differences between them. Furthermore, the frequency of the ripple current flowing through the output capacitor C1 is equal to four times the switching frequency.

Ripple currents flowing through the respective second inductors L15-L18 and a ripple current flowing through the output capacitor C2 are similar to the ripple currents flowing through the respective first inductors L11-L14 and the ripple current flowing through the output capacitor C1.

In the following description, the semiconductor switching elements Q1-Q6, Q11-Q18, and Q21-Q24 will be referred to as semiconductor switching elements Q in the case where it is not necessary to discriminate between them. The first inductors L1, L2, and L11-L14, and the second inductors L3, L4, and L15-L18 will be referred to as inductors L in the case where it is not necessary to discriminate between them. The output capacitors C1 and C2 will be referred to as output capacitors C in the case where it is not necessary to discriminate between them. The diodes D7, D8, and D31-D34 will be referred to as diodes D in the case where it is not necessary to discriminate between them. And a generic term "transformer(s) T" will be used for the transformers T1, T11, and T12.

<Reduction of Size of Output Capacitors C by Multi-Phase Configuration>

As described above, in the power supply apparatus 1 or 2 according to the embodiment, electrical continuity between the secondary winding of the (or each) transformer T and (the associated ones of) a plurality of parallel-connected inductors L is established in order. As a result, triangular-wave-like ripple currents that are deviated from each other in phase flow through the respective inductors L.

For example, where the primary-side circuit is the single-phase inverter circuit 11 and is connected to the transformer T1, ripple currents that are deviated from each other in phase by 180° flow through the respective inductors L1 and L2. In this case, since the ripple currents flowing through the respective inductors L1 and L2 cancel out each other, only a small ripple current flows through the output capacitor C1. Furthermore, since the frequency of the ripple current flowing through the output capacitor C1 is equal to two times the switching frequency of the inverter circuit 11 (primary-side circuit), the capacitive reactance can be decreased according to the increase of the frequency of the ripple current flowing through the output capacitor C1.

For example, where the primary-side circuit is a 3-phase inverter and is connected to a Δ-connection transformer, a phase difference of 120° can be produced between ripple currents flowing through the respective inductors L. In this case, since the ripple currents flowing through the respective inductors L cancel out each other according to phase differences between them, only a small ripple current flows through the output capacitor C1. Furthermore, since the frequency of the ripple current flowing through the output capacitor C1 is equal to three times the switching frequency of the inverter (primary-side circuit), the capacitive reactance can be decreased according to the increase of the frequency of the ripple current flowing through the output capacitor C1.

For example, where the primary-side circuit is the 4-phase inverter circuit 31 and is connected to the two transformers T11 and T12, a phase difference of 90° can be produced between ripple currents flowing through the respective inductors L. In this case, since the ripple currents flowing through the respective inductors L cancel out each other according to phase differences between them, only a small ripple current flows through the output capacitor C1. Furthermore, since the frequency of the ripple current flowing through the output capacitor C1 is equal to four times the switching frequency of the inverter (primary-side circuit), the capacitive reactance can be decreased according to the increase of the frequency of the ripple current flowing through the output capacitor C1.

That is, where the primary-side circuit is a multi-phase (N-phase) inverter and is connected to a transformer(s) suitable for it, a phase difference of 360°/N can be produced between ripple currents flowing through the respective inductors L. In this case, since the ripple currents flowing through the respective inductors L cancel out each other according to phase differences between them, only a small ripple current flows through the output capacitor C1. Furthermore, since the frequency of the ripple current flowing through the output capacitor C1 is equal to N (the number of phases) times the switching frequency of the inverter (primary-side circuit), the capacitive reactance can be decreased according to the increase of the frequency of the ripple current flowing through the output capacitor C1.

In each of the case that the primary-side circuit is a single-phase inverter and is connected to a transformer and the case that the primary-side circuit is a multi-phase inverter and is connected to transformers suitable for it, the output capacitor C2 is given the same advantages as the output capacitor C1. That is, a ripple current flowing through the output capacitor C2 can be made small and the capacitive reactance can be decreased according to the increase of the frequency of the ripple current flowing through the output capacitor C2.

Thus, by producing phase differences between ripple currents flowing through the respective inductors L, the ripple currents cancel out each other according to the phase differences between them, whereby a ripple current flowing through the output capacitor C can be reduced.

Furthermore, the capacitive reactance can be decreased by increasing the frequency of a ripple current flowing through the output capacitor C, which enables use of a circuit element having a smaller capacitance and makes it unnecessary to use a large output filter.

<Reduction of Total Conduction Loss by Secondary-Side Current Division>

Figure 4:
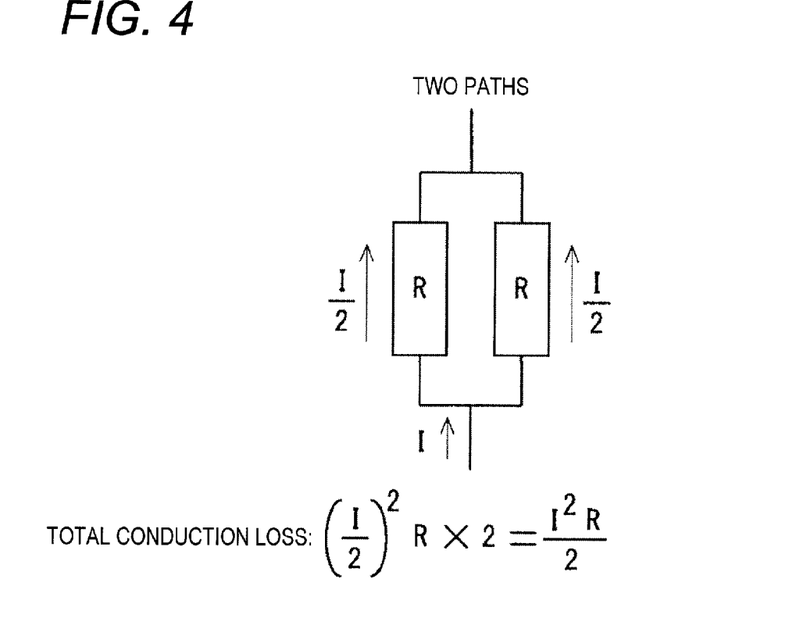
FIG. 4 shows the total conduction loss in a secondary-side circuit in the case where a primary-side circuit is a single-phase inverter.

As shown in FIG. 1, where the primary-side circuit is the single-phase inverter circuit 11, the two large-current branch paths are formed in the secondary-side circuit. The total conduction loss in this secondary-side circuit will be described below with reference to FIG. 4. FIG. 4 shows the total conduction loss that occurs in this secondary-side circuit in the case where the primary-side circuit is the single-phase inverter circuit 11. The two current paths shown in FIG. 4 are the paths of currents flowing through the first inductors L1 and L2, respectively. As shown in FIG. 4, a current flowing through each current path is half of an output current.

More specifically, where it is assumed that there exists only one large-current path, the conduction loss of the semiconductor switching element Q in the secondary-side circuit is given by $RI^2$, where I is the output current and R is the on-resistance of the semiconductor switching element Q. On the other hand, as shown in FIG. 4, in the case where there are two large-current branch paths, the total conduction loss of the two large-current branch paths is given by the following equation (1):

$$\left(\frac{I}{2}\right)^2 R \times 2 = \frac{I^2 R}{2} \qquad (1)$$

That is, the total conduction loss is halved by dividing the large-current path into two parts.

Figure 5:
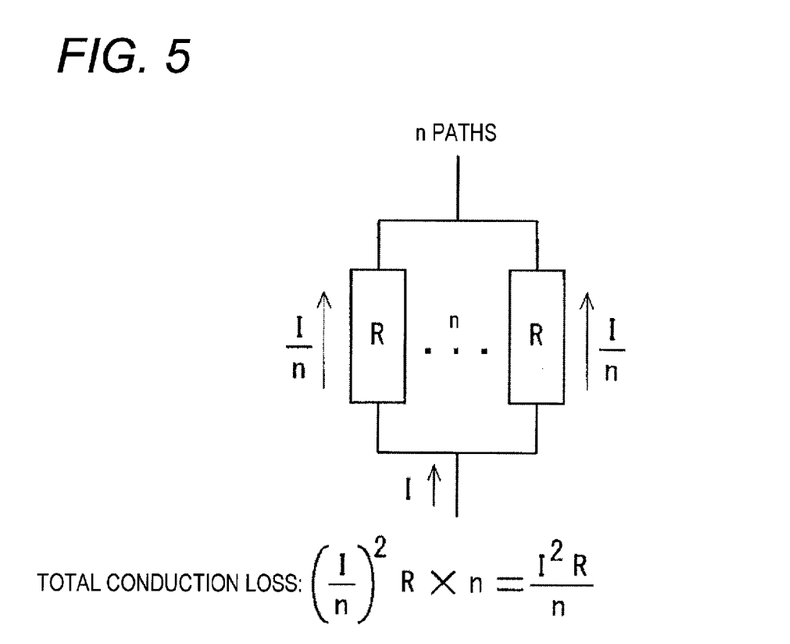
FIG. 5 shows the total conduction loss in a secondary-side circuit in the case where a primary-side circuit is a multi-phase inverter.

The total conduction loss in a case that the division number in the secondary-side circuit is set at n will be described below with reference to FIG. 5. FIG. 5 shows the total conduction loss that occurs in this secondary-side circuit in the case where the primary-side circuit is an n-phase inverter. The n current paths shown in FIG. 5 are the paths of currents flowing through the n inductors L, respectively. As shown in FIG. 5, a current flowing through each current path is 1/n of a current of the case that the current path is not divided.

More specifically, where it is assumed that there exists only one large-current path, the conduction loss of the semiconductor switching element Q in the secondary-side circuit is given by $RI^2$, where I is the output current and R is the on-resistance of the semiconductor switching element Q. On the other hand, as shown in FIG. 5, in the case where there are n large-current branch paths, the total conduction loss of the n large-current branch paths is given by the following equation (2):

$$\left(\frac{I}{n}\right)^2 R \times n = \frac{I^2 R}{n} \qquad (2)$$

That is, the total conduction loss is reduced to 1/n by dividing the large-current path into n parts. For example, in the power supply apparatus 2 of FIG. 3, the total conduction loss of the semiconductor switching elements Q21-Q24 is made ¼ of that of the case that the current path is not divided.

As described above, by connecting a plurality of inductors L in parallel and thereby increasing the number of inductor current paths, the total conduction loss of the semiconductor switching elements Q in the secondary-side circuit can be reduced, whereby the power consumption can be reduced and a low-loss circuit can be realized.

Furthermore, the current flowing through the inductor L on each current path decreases as the number of current paths increases. That is, although the number of inductors L increases as the number of current paths increases, the size of each inductor L is made smaller than before the increase of the number of current paths.

Incidentally, a configuration in which a single-phase inverter and a transformer is combined and the current path in the secondary-side circuit is divided into more than two parts to reduce the total conduction loss in the secondary-side circuit means that sets of a semiconductor switching element Q5 and a diode D5 (see FIG. 1) are arranged in parallel and sets of a semiconductor switching element Q6 and a diode D6 (see FIG. 1) are also arranged in parallel. In this case, the increase of the number of paths does not case increase of the ripple frequency. It is therefore desirable that the number of branch paths in the secondary-side circuit be a number that can produce a phase difference as shown in FIG. 2. The increase of the ripple frequency can realize both of reduction of size of the output capacitors C and reduction of the total conduction loss.

<Increase of the Number of Components by Multi-Phase Configuration>

Where the primary-side circuit is a single-phase inverter and is connected to a transformer, a plurality of diodes D can be shared in the secondary-side circuit and the number of circuit elements can be reduced accordingly.

On the other hand, where the primary-side circuit is a multi-phase inverter and is connected to suitable transformers, although a plurality of diodes D can be shared in the secondary-side circuit and this contributes to reduction of the number of circuit elements, the number of components increases in each of the primary-side circuit and the secondary-side circuit.

However, as described above, since individual components can be reduced in size, the size of the whole circuit can be made smaller than in a case that large components exist in a small number by arranging the components in an optimum manner. That is, although the number of components is increased, the whole circuit can be made smaller because the size of the individual components is reduced.

<Advantages>

As described above, since there exist a plurality of paths that extend from the secondary winding of the (or each) transformer T to each of the first and second outputs, the total conduction loss of the semiconductor switching elements Q and the diodes D in the secondary-side circuit can be reduced, whereby the power consumption can be reduced and a low-loss circuit can be realized.

Furthermore, since electrical continuity between the secondary winding of the (or each) transformer T and (the associated ones of) the plurality of parallel-connected inductors L is established in order, phase differences can be produced between ripple currents flowing through the respective inductors L. As a result, the ripple currents flowing through the respective inductors L are canceled out each other, whereby a ripple current flowing through the output capacitor C can be reduced. Furthermore, the frequency of the ripple current flowing through the output capacitor C increases, the size of the output capacitor C can be reduced.

In other words, by establishing electrical continuity between the secondary winding of the (or each) transformer T and the plurality of parallel-connected inductors L in order, phase differences are produced between ripple currents flowing through the respective inductors L and the frequency of a ripple current flowing through the output capacitor C is increased, whereby the size of the output capacitor can be reduced. Furthermore, since the total conduction loss of the semiconductor switching elements Q can be reduced by increasing the number of current paths in the secondary-side circuit, it becomes possible to realize low loss and reduction of size while outputting a plurality of different voltages at the same time.

As described above, the power supply apparatus 1 according to the embodiment is a power supply apparatus in which the primary-side circuit for DC-to-AC conversion and the secondary-side circuit for AC-to-DC conversion are coupled to each other magnetically via the transformer T1. The power supply apparatus 1 includes the control unit 21 for controlling the primary-side circuit and the secondary-side circuit. The secondary-side circuit has the first circuit which is connected to the secondary winding of the transformer T1, performs current doubler rectification, and outputs a first output voltage V1, the second circuit which is connected to the secondary winding of the transformer T1, performs a step-down chopping operation, and outputs a second output voltage V2, a plurality of semiconductor switching elements Q5 and Q6 for controlling the step-down chopping operation, and a plurality of diodes D7 and D8 which are shared by the first circuit and the second circuit in rectifying a DC voltage supplied from the primary-side circuit. The first circuit includes the plurality of parallel-connected first inductors L1 and L2. The control unit 21 establishes electrical continuity between the secondary winding of the transformer T1 and the first inductors L1 and L2 in order by controlling the switching in the primary-side circuit.

Configured as described above, the power supply apparatus 1 can realize low loss and reduction of size while outputting a plurality of different voltages at the same time using the single transformer T1.

The power supply apparatus 2 according to the embodiment is a power supply apparatus in which the primary-side circuit for DC-to-AC conversion and the secondary-side circuit for AC-to-DC conversion are coupled to each other magnetically via the transformers T11 and T12. The power supply apparatus 1 includes the control unit 21 for controlling the primary-side circuit and the secondary-side circuit. The secondary-side circuit includes the first circuit which is connected to the secondary windings of the transformers T11 and T12, performs current doubler rectification, and outputs a first output voltage V1, the second circuit which is connected to the secondary windings of the transformers T11 and T12, performs a step-down chopping operation, and outputs a second output voltage V2, a plurality of semiconductor switching elements Q21-Q24 for controlling the step-down chopping operation, and a plurality of diodes D31-D34 which are shared by the first circuit and the second circuit in rectifying DC voltages supplied from the primary-side circuit. The first circuit includes the plurality of parallel-connected first inductors L11-L14. The control unit 21 establishes electrical continuity between the secondary winding of each of the transformers T11 and T12 and the associated ones of the first inductors L11-L14 in order by controlling the switching in the primary-side circuit.

Configured as described above, the power supply apparatus 2 can realize low loss and reduction of size while outputting a plurality of different voltages at the same time.

In the power supply apparatus 1 according to the embodiment, the second circuit includes the plurality of parallel-connected second inductors L3 and L4 and the control unit 21 establishes electrical continuity between the secondary winding of the transformer T1 and the second inductors L3 and L4 in order by controlling the switching of the primary-side circuit and the semiconductor switching elements Q5 and Q6.

With these measures, in the power supply apparatus 1, a phase difference is produced between ripple currents flowing through the second inductors L3 and L4. Since the ripple currents cancel out each other when they are added together, a ripple current flowing through the output capacitor C2 can be made small. Furthermore, the capacitive reactance can be reduced according to the increase of the frequency of the ripple current.

In the power supply apparatus 2 according to the embodiment, the second circuit includes the plurality of parallel-connected second inductors L15-L18 and the control unit 21 establishes electrical continuity between the secondary winding of each of the transformers T11 and T12 and the associated ones of the second inductors L15-L18 in order by controlling the switching of the primary-side circuit and the semiconductor switching elements Q21-Q24.

With these measures, in the power supply apparatus 2, a phase difference is produced between ripple currents flowing through the second inductors L15-L18. Since the ripple currents cancel out each other when they are added together, a ripple current flowing through the output capacitor C2 can be made small. Furthermore, the capacitive reactance can be reduced according to the increase of the frequency of the ripple current.

In the power supply apparatus 1 according to the embodiment, the control unit 21 turns on the semiconductor switching elements Q5 and Q6 in order according to a switching operation of the primary-side circuit.

With this measure, in the power supply apparatus 1, the total conduction loss of the semiconductor switching elements Q5 and Q6 in the secondary-side circuit can be reduced, whereby the power consumption can be reduced and a low-loss circuit can be realized.

In the power supply apparatus 2 according to the embodiment, the control unit 21 turns on the semiconductor switching elements Q21-Q24 in order according to a switching operation of the primary-side circuit.

With this measure, in the power supply apparatus 2, the total conduction loss of the semiconductor switching elements Q21-Q24 in the secondary-side circuit can be reduced, whereby the power consumption can be reduced and a low-loss circuit can be realized.

Although the invention has been described above in the form of the embodiment, the invention is not limited to the embodiment and various modifications are possible without departing from the spirit and scope of the invention.

For example, although in the embodiment the semiconductor switching elements Q are MOSFETs, they may be IGBTs.

Additionally, although in the embodiment the semiconductor switching elements Q used in the primary-side circuit and those used in the secondary-side circuit are both MOSFETs, the invention is not limited to that case, that is, the semiconductor switching elements Q used in the primary-side circuit and those used in the secondary-side circuit may be of different types.

There are no limitations on the MOSFETs that are used as the semiconductor switching elements Q in the embodiment; they may be ones formed in a semiconductor having a wide band gap.

Although in the embodiment the MOSFETs that are used as the semiconductor switching elements Q in the embodiment are of the n-channel type, the invention is not limited to that case, that is, they may be of the p-channel type.

Although in the embodiment a voltage across the output capacitor C1 and a voltage across the output capacitor C2 are output at the same time, the invention is not limited to that case, that is, a configuration is possible in which voltages across three or more output capacitors C are output at the same time. For example, where a configuration in which voltages across three or more output capacitors C are output at the same time is applied as a power supply for a DC power distribution system rather than vehicle-mounted devices, it can work in such a manner as to be suitable for rated voltages of respective target devices. More specifically, for example, it becomes possible to supply DC power to a DC-48-V battery backup power supply of a communication device, a DC-24-V server power supply, and an ICT device that is driven at DC 12 V. It also becomes possible to supply DC power to, for example, a data center that includes air-conditioning equipment, communication devices, and illumination devices.

Each of the diodes D1-D6, D11-D18, and D21-D24 employed in the embodiment may be a body diode of the MOSFET connected to it or may be attached externally to the MOSFET connected to it.

The diodes D7, D8, and D31-D34 employed in the embodiment may be replaced by MOSFETs and subjected to a synchronous rectification control. This makes it possible to reduce the total conduction loss further.

Further reduction of size may be attained by employing trans-link type inductors as the inductors L.

What is claimed is:

1. A power supply apparatus comprising:
   a primary-side circuit that converts direct current to alternating current;
   a secondary-side circuit that converts alternating current to direct current;
   a transformer that magnetically couples the primary-side circuit and the secondary side circuit; and
   a control unit that controls the primary-side circuit and the secondary-side circuit,
   wherein the secondary-side circuit comprises:
      a first circuit that is connected to a secondary winding of the transformer, performs current doubler rectification, and outputs a first output voltage;
      a second circuit that is connected to the secondary winding of the transformer, performs a step-down chopping operation, and outputs a second output voltage;
      a plurality of semiconductor switching elements that control the step-down chopping operation; and
      a plurality of diodes that are shared by the first circuit and the second circuit when rectifying a direct current voltage supplied from the primary-side circuit,
   wherein the first circuit comprises a plurality of first inductors connected in parallel, and
   wherein the control unit controls switching of the primary-side circuit to establish electrical continuity between the secondary winding of the transformer and the first inductors in order.

2. The power supply apparatus according to claim 1,
wherein the second circuit comprises a plurality of second inductors connected in parallel, and
wherein the control unit controls switching of the primary-side circuit and the semiconductor switching elements to establish electrical continuity between the secondary winding of the transformer and the second inductors in order.

3. The power supply apparatus according to claim 2,
wherein the control unit turns on the semiconductor switching elements in order according to a switching operation of the primary-side circuit.

* * * * *